Patented Sept. 20, 1949

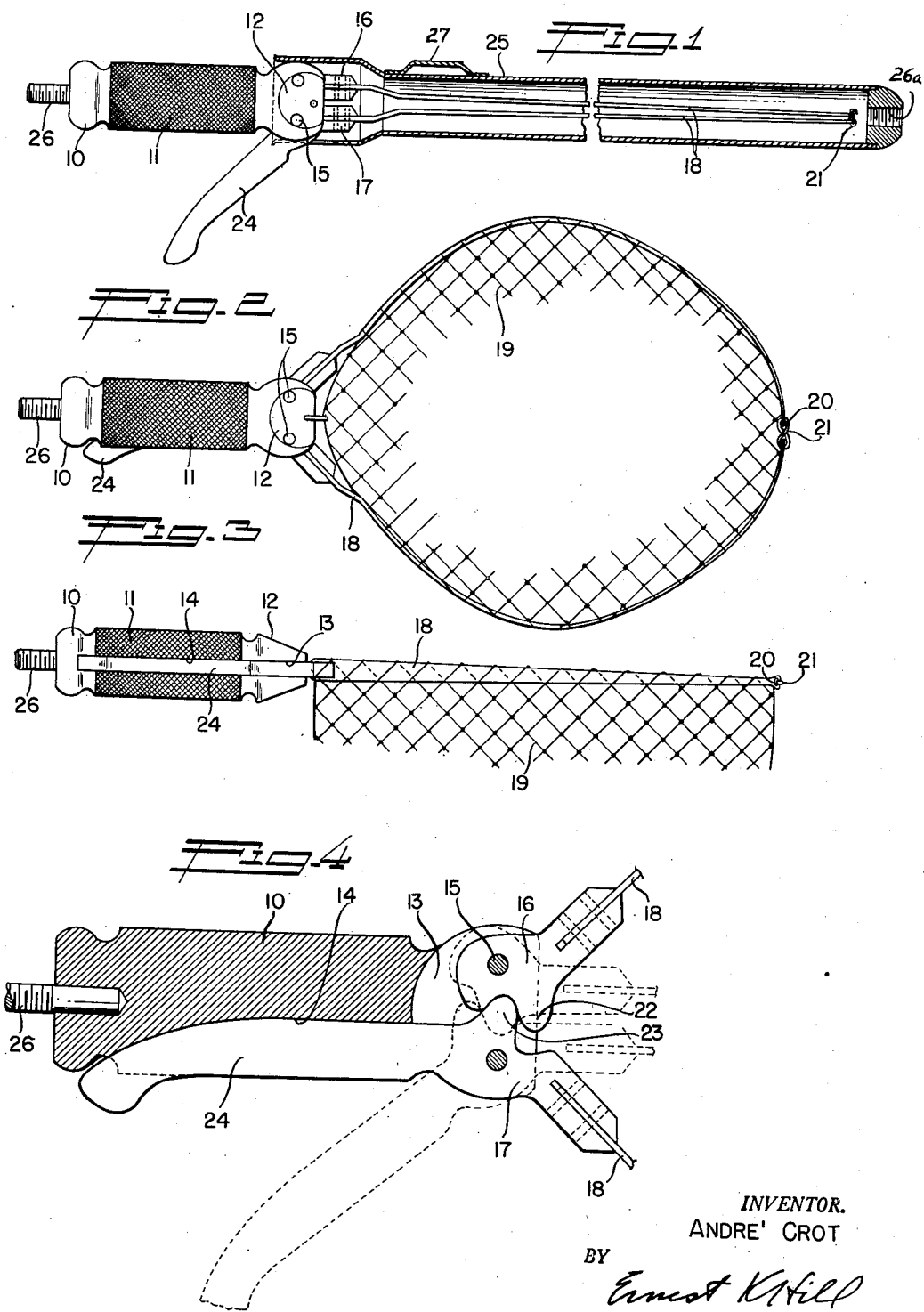

2,482,157

UNITED STATES PATENT OFFICE 2,482,157

CLOSABLE MOUTH LANDING NET

André Crot, Topanga, Calif.

Application August 10, 1946, Serial No. 689,736

3 Claims. (Cl. 43—12)

This invention relates to an improved and simplified self-closing or folding fish landing net that is adapted to be carried in a collapsed condition, as in a sheath supported from the user's belt, and which can be readily withdrawn from its sheath and opened at the instant of use, closing over the fish gathered in the net, upon release of pressure on the operating means.

Collapsible or folding fish landing nets have been proposed in the past, but the frames therefor have had to be opened in advance and remained open until manually closed, on the principle of an umbrella mechanism. It is accordingly an important object of this invention to provide an improved and simplified landing net of the class described that can be manipulated with one hand at the instant of need and controlled by the grip of the hand thereon to open to gather in a fish, and thereafter to close to retain the fish in the net, without possibility of accidental escape.

It is a further object of this invention to provide an improved and easily manipulated fish landing net frame of the type described, on which the net can be rolled about a small compass and carried like a sword in a sheath or scabbard suspended from the fisherman's belt.

It is another object of this invention to provide an improved and simplified operating mechanism for expanding or opening a collapsible landing net frame whereby natural and normal muscular movements of one hand control the opening and closing of the net frame.

Other objects and features of the invention will be readily understood from the following detailed description of a typical preferred form of the invention wherein reference will be made to the accompanying drawings in which:

Figure 1 is a plan view of the net frame of this invention with the net omitted for clearness, as inserted in a carrying sheath or scabbard, shown in section;

Figure 2 is a plan view of the open or expanded net frame of Figure 1 with a net shown in position thereon;

Figure 3 is a side view corresponding to the showing of Figure 2; and

Figure 4 is a fragmentary detailed section, to an enlarged scale, showing the operating mechanism in the handle.

Referring to the form of my invention shown in the several views, 10 is a handle having a suitable roughened grip portion 11, and a head portion 12 provided with a cross slot 13 merging into a longitudinal slot 14 extending along the grip portion 11. Two pivot pins 15 extend across the slot 13, and intermeshing segments 16 and 17 pivot on the pins. Each segment has a springlike tapered blade 18 secured therein which blades together form the frame on which a conventional landing net 19 is threaded. After placing the net on the frame or blades, the outer tips of the blades, formed with eyes 20, are connected together by a wire or link 21.

Normally, the blades 18 are straight and approximately parallel, as shown in Figure 1. In order to expand the frame into a roughly circular opening or mouth, suitable for scooping up a fish, the segments 16 and 17 are provided with intermeshing cam-like surfaces 22 and 23, which resemble gear teeth. The segment 17 is also provided with a lever 24, which can be pressed into the slot 14 in the handle grip to rotate the segment 17 into the full line position of Figure 4, the intermeshing surfaces 22 and 23 simultaneously rotating the other segment 16 in the opposite direction into its full line position as shown.

The natural resiliency of the springlike blades assures a return to the position of Figure 1 upon release of hand pressure on the lever 24, thus closing the mouth of the net about a fish therein, and when not in use the net can be wound up around the blades and the whole inserted into a sheath or scabbard 25 carried on the user's belt by means of member 27, to protect the net from catching on bushes as the fisherman works his way along a stream.

A threaded stud 26 is provided on the handle 10 in cooperation with threaded portion 26a to enable the user to reverse and screw the scabbard 25 thereon to form an extended handle, for use for example, from a boat, in which case the lever 24 can be tied down in the position of Figure 2 to hold the blades 18 open.

In operation the net will normally be carried in its sheath or scabbard, leaving the fisherman free to use both hands in manipulating his tackle during the play of a fish. When the time for netting arrives he can withdraw the net from its scabbard with one hand, free the body of the net from its position about the blades by shaking the net, and open the blades or jaws by squeezing the lever 24 into the slot 14 as shown in Figures 2 and 4. When the net surrounds the fish, release of the lever 24 permits the blades 18 to close, confining the fish to prevent accidental loss thereof.

Having described only a typical form of the invention, I do not wish to be limited to the specific details herein set forth, but wish to reserve to myself any variations or modifications

I claim as my invention:

1. A fish landing net frame of the type described comprising a handle, a pair of intermeshing gearlike segments separately pivoted at one end of said handle, springlike blade members carried by said segments and so positioned as to extend approximately parallel to each other when the segments are at one extreme of their pivotal motions, a lever associated with one of said segments and adapted when drawn toward said handle to rotate both segments in directions to spread said blades apart to form an opening, and means linking the free ends of said blades together whereby the springlike resiliency of said blades is adapted to close the opening therebetween upon release of hand pressure on said lever.

2. A fish landing net frame of the type described comprising a pair of resilient blade members normally disposed approximately parallel to each other in close juxtaposition when not distorted by forces imposed thereon, a link joining the outer ends of said blades together, members separately and pivotally supporting the other ends of said blades in said handle, a hand lever associated with one of said members, so constructed and arranged as to rotate said member about its pivot in a direction to distort its associated blade into a bowed form away from the other blade, and means intermeshingly connecting said members together whereby to produce equal and opposite distortions of said blades to open the mouth of a net adapted to be carried by said blades.

3. A fish landing net frame of the type described adapted to carry a net comprising a pair of resilient blade members normally disposed approximately parallel to each other in close juxtaposition when not distorted by forces imposed thereon, a link joining the outer ends of said blades together, members separately and pivotally supporting the other ends of said blades in said handle, a hand lever associated with one of said members, so constructed and arranged as to rotate said member about its pivot in a direction to distort its associated blade into a bowed form away from the other blade, and means intermeshingly connecting said members together whereby to produce equal and opposite distortions of said blades to open a mouth of the net carried by said blades.

ANDRÉ CROT.

REFERENCES CITED

The following references are of record in the file of this patent:

UNITED STATES PATENTS

| Number | Name | Date |
|---|---|---|
| 580,634 | Bannerman et al. | Apr. 13, 1897 |
| 959,555 | Koberstein | May 31, 1910 |
| 996,234 | Fritz | June 27, 1911 |
| 1,028,428 | Brunello | June 4, 1912 |